US012360496B2

(12) United States Patent
Stranczl

(10) Patent No.: US 12,360,496 B2
(45) Date of Patent: Jul. 15, 2025

(54) TIMEPIECE DISPLAY DEVICE ON MULTIPLE LEVELS

(71) Applicant: Montres Breguet S.A., L'Abbaye (CH)

(72) Inventor: Marc Stranczl, Nyon (CH)

(73) Assignee: Montres Breguet S.A., L'Abbaye (CH)

( * ) Notice: Subject to any disclaimer, the term of this patent is extended or adjusted under 35 U.S.C. 154(b) by 644 days.

(21) Appl. No.: 17/480,541

(22) Filed: Sep. 21, 2021

(65) Prior Publication Data

US 2022/0179363 A1 Jun. 9, 2022

(30) Foreign Application Priority Data

Dec. 8, 2020 (EP) .................................... 20212418

(51) Int. Cl.
*G04B 19/247* (2006.01)
*G04B 31/02* (2006.01)

(52) U.S. Cl.
CPC ........... *G04B 19/247* (2013.01); *G04B 31/02* (2013.01)

(58) Field of Classification Search
CPC ............................ G04C 17/005; G04B 19/247
See application file for complete search history.

(56) References Cited

U.S. PATENT DOCUMENTS 286,851 A * 10/1883 Schaeppi ............. G04B 13/021 368/322
2,749,704 A 6/1956 Heikkila
3,675,413 A 7/1972 Fluck
3,854,280 A 12/1974 Wuthrich
4,327,429 A * 4/1982 Klingenberg ........ G04B 39/006 968/371
4,362,397 A 12/1982 Klingenberg
5,936,914 A 8/1999 Yamaguchi et al.
(Continued)

FOREIGN PATENT DOCUMENTS

CH 715 286 B1 2/2020
CN 107179679 A 9/2017
(Continued)

OTHER PUBLICATIONS

European Search Report issued May 10, 2021 in European Application 20212418.6 filed Dec. 8, 2020 (with English Translation of Categories of Cited Documents), 3 pages.
(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A timepiece display device including a first display element and a second display element superimposed above a fixed part including a main bearing surface, this second display element is subjected to opposing forces exerted, on the one hand by lower return means which tend to bring the second display element closer to the first display element, and, on the other hand, by upper return mechanism which tends to move the second display element away from the first display element without contact between them or else by mechanical spacing device which includes a bearing surface providing a stop bearing function on a stop surface of the second display element, to limit the travel from the second display element to the first display element.

28 Claims, 4 Drawing Sheets

(56) References Cited

U.S. PATENT DOCUMENTS

| | | | | |
|---|---|---|---|---|
| 2013/0279304 | A1* | 10/2013 | Stark | G04B 19/06 368/232 |
| 2016/0327912 | A1* | 11/2016 | Chevallier | G04B 47/042 |
| 2017/0261938 | A1 | 9/2017 | Cho et al. | |

FOREIGN PATENT DOCUMENTS

| | | | |
|---|---|---|---|
| CN | 111142360 | A | 5/2020 |
| CN | 111142361 | A | 5/2020 |
| EP | 0 316 501 | A1 | 5/1989 |
| EP | 1 045 299 | A2 | 10/2000 |
| EP | 0 927 917 | B1 | 3/2004 |
| FR | 2 097 126 | A1 | 3/1972 |
| FR | 2 274 081 | A1 | 1/1976 |
| GB | 2 062 909 | A | 5/1981 |
| JP | 9-49887 | A | 2/1997 |
| JP | 9-54177 | A | 2/1997 |
| JP | 2015-500493 | A | 1/2015 |
| WO | WO 99/04322 | A1 | 1/1999 |

OTHER PUBLICATIONS

Japanese Office Action issued Jan. 10, 2023 in Japanese Patent Application No. 2021-146634 (with English Translation), 14 pages.

Office Action issued Sep. 27, 2022, in corresponding Japanese Patent Application No. 2021-146634 (with English Translation), 13 pages.

Combined Chinese Office Action and Search Report issued on Aug. 26, 2023 in the corresponding Chinese Patent Application No. 202111345253.9 (with English Translation and Translation of Category of Cited Documents), 19 pages.

* cited by examiner

TIMEPIECE DISPLAY DEVICE ON MULTIPLE LEVELS

CROSS-REFERENCE TO RELATED APPLICATION

This application claims priority to European Patent Application No. 20212418.6 filed on Dec. 8, 2020, the entire disclosure of which is hereby incorporated herein by reference.

TECHNICAL FIELD OF THE INVENTION

The invention relates to a timepiece display device including a first display element and at least a second substantially flat display element superimposed above a fixed part including a main bearing surface.

The invention also relates to a timepiece, in particular a watch, including at least one such display device.

The invention relates to the field of displays for timepieces.

TECHNOLOGICAL BACKGROUND

Some timepieces, in particular watches, include a plurality of display elements, other than hands, superimposed on each other, substantially parallel to each other, these elements possibly being in the most general case flat, or else include a convexity or a concavity. Such display elements can be discs, rings, flags, or other wheel sets. Some display elements may have a significant thickness, in particular when they include an optical transfer element, such as an optical conductor, formed for example of a bundle of plastic, or polymer, or glass, or similar optical fibres, or a magnifying glass, or the like.

The adjustment of the distance between two such display elements is important, on the one hand for mechanical reasons to avoid any interference, and on the other hand for optical reasons, to offer the user a sharpness of vision of the markings located on all floors of the timepiece. Attention is focused here on frontal vision, that is to say in a direction substantially perpendicular to the plane of the platen, the dial, or else the crystal.

The use of an optical conductor, in particular of a bundle of optical fibres, or other display element requires precise adjustment of the distance in the frontal direction because, in the case of optical conductors, in particular of bundles of optical fibres, this is essential to reproduce a pattern that is not blurred. In other cases, it is necessary to avoid variations in height between the patterns which would be perceptible by the user.

In general, it is necessary to prevent the adjustment system from damaging the visible pattern. It is for this reason that it is not possible to directly rub a pattern to be reproduced on the optical conductor or the bundle of optical fibres, for example, because the friction would deteriorate the display patterns over time.

The adjustment of the distance in this frontal direction in the cases below is essential to obtain the desired visual effect.

SUMMARY OF THE INVENTION

The invention proposes to improve a timepiece display device, including several display elements, on several parallel or substantially parallel levels, so as to avoid interference or friction between some of these elements, by introducing means for controlling the distance between two display elements, and, more particularly, means for adjusting the distance between two display elements.

To this end, the invention relates to a timepiece display device according to claim 1.

The invention also relates to a timepiece, in particular a watch, including at least one such display device.

BRIEF DESCRIPTION OF THE FIGURES

Other features and advantages of the invention will become apparent upon reading the detailed description which follows, with reference to the appended drawings, where.

DETAILED DESCRIPTION OF THE INVENTION

Figure 1:
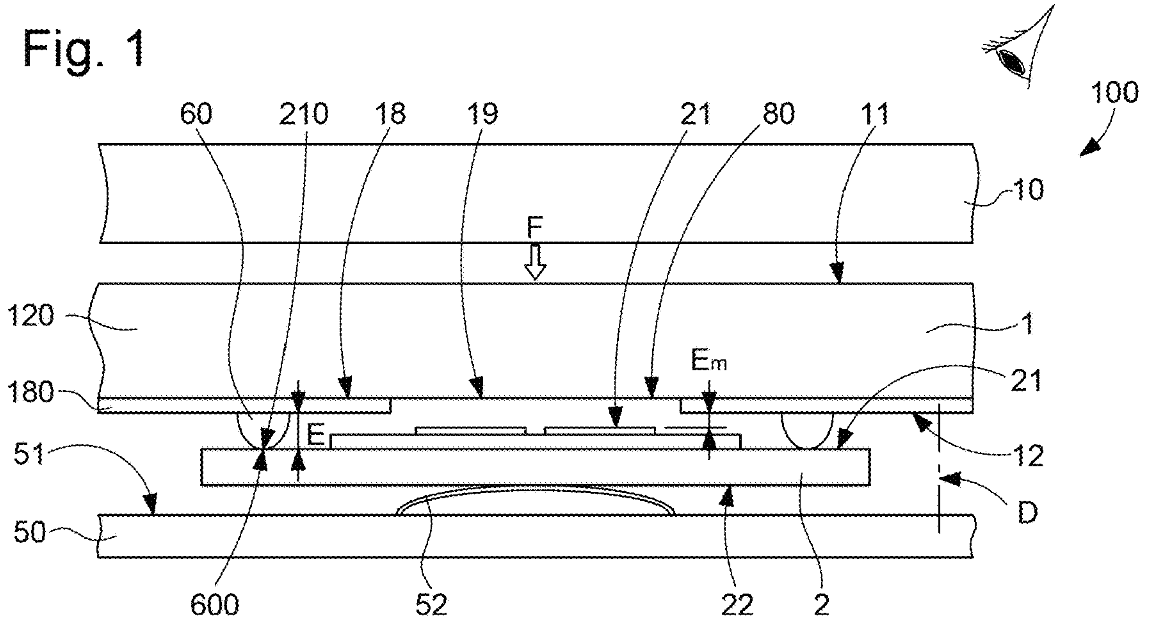
FIG. 1 shows, schematically and in sectional view passing through a frontal viewing direction, a timepiece display device according to a first variant of the invention, including a first display element on the user side, here represented by a sapphire dial, and a second display element which is here a display disc movable around an axis of rotation, which are both substantially flat, and which are superimposed above a main bearing surface included in a fixed element such as a platen or the like; the first display element here includes, on its lower face, that is to say opposite the user, a coating, a first upper surface of which is visible to the user, and a first lower surface of which faces the second display element located below; this second display element includes, on its upper face, which is visible to the user when it is not hidden by the coating of the first display element, at least one display pattern which can be seen by the user in an opening or an aperture included in the first display element; this second display element is moved away from the main bearing surface by lower return means, here represented by elastic return means like a spring, which tends to push it towards the first display element, from which it remains nevertheless remote by means of spacing means which ensure a minimum functional clearance between this first display element and this second display element; these spacing means are advantageously elastic, to absorb the effects of an impact, if applicable, for example when the timepiece falls, and to safeguard the integrity of these two display means; preferably, these spacing means are in an area invisible to the user, they can indifferently be carried by the first display element, by the second display element, or else by a fixed element connected to the platen for example.

The invention relates more particularly to a timepiece display device 100, which includes a first display element 1 and at least a second display element 2 which are substantially flat, superimposed above a fixed part 50 including a main bearing surface 51.

According to the invention, at least a second display element 2 is subjected to opposing forces, which are exerted in a frontal direction F:

- on the one hand by lower return means 52, included in the device 100, and which tend to bring this at least second display element 2 closer to a first lower surface 12 included in the first display element 1, and,
- on the other hand, by upper return means 63 which tend to move this at least second display element 2 away from the first lower surface 12 of the first display element 1 without contact between this second display element 2 and the first display element 1 and/or by mechanical spacing means 60, included in the device 100, and which include a bearing surface 600 arranged to provide a stop bearing function on a stop surface 210 included in this second display element 2, to limit the travel of the second display element 2 towards the first lower surface 12.

More particularly, this device 100 extends over several parallel or substantially parallel levels, and includes, separated from the user by a crystal 10, the first substantially flat display element 1, that is to say flat or having a curvature greater than 10 cm, including a first upper surface 11 visible to the user and opposite to the first lower surface 12, and, separated from the crystal 10 by the first display element 1, at least a second substantially flat display element 2, that is to say flat or having a curvature greater than 10 cm, including a second upper surface 21 visible to the user and a second lower surface 22 opposite to the second upper surface 21. Each second display element 2 is movable above the main bearing surface 51. The lower return means 52 tend to move at least a second display element 2 away from the main surface 51 in order to bring this at least second display element 2 closer to the first lower surface 12, and more particularly tend to move each second display element 2 away from the main surface 51 to bring each second display element 2 closer to the first lower surface 12. And the upper return means 63 and/or the spacing means 60 are arranged to ensure a functional clearance Em between this at least one said second display element 2 and the first lower surface 12. More particularly, at least two second display means 2 are staggered at different distances from the main surface 51, and are kept separate from one another by spacing means 60 included in the device 100.

More particularly still, the first display element 1 includes on the one hand at least a first screen surface 18, which is visible to the user, and which is arranged to locally hide from the sight of the user at least part of the second upper surface 21 of a second display element 2 located between the first display element 1 and the main bearing surface 51, in a frontal viewing direction F, substantially normal to a plane tangent to the first upper surface 11 of the first display element 1 or to a second upper surface 21 or to the main bearing surface 51. This first display element 1 also includes at least a first viewing area 19 which is an opening or an optical conductor or a transparent or translucent area, at least a first viewing area 19 of which is arranged to allow the user to see at least part of a said second upper surface 21, and/or a said second lower surface 22 when the second display element is transparent, of a second display element 2 located between the first display element 1 and the main bearing surface 51, in the frontal direction F.

In a particular embodiment, the device 100 includes spacing means 60, the bearing surface 600 of which is arranged to cooperate with the stop surface 210 included in a second upper surface 21 of a second display element 2, and this stop surface 210 is masked by a first screen surface 18, and is not visible to the user.

The present description describes different variants of the invention in particular and non-limiting applications, relative to the positioning in a frontal direction F of a movable display element 2 relative to a sapphire dial 1, to an optical fibre 70, or another movable display element.

FIG. 1 shows such a display device 100, including a first display element 1 on the user side, here represented by a sapphire dial, and a second display element 2, which is here a display disc movable around an axis of rotation D, which are both substantially flat, and which are superimposed above a main bearing surface 51 which includes a fixed element 50 such as a platen or the like. The arrow F indicates a frontal viewing direction, substantially perpendicular to the first display element 1, or to the second display element 2, or to the fixed element 50. The first display element 1 includes here, on its lower face, that is to say opposite the user, a coating, a first upper surface 18 of which is visible to the user, and a first lower surface 12 of which faces the second display element 2 located below. This second display element 2 includes, on its upper face 21, which is visible to the user when it is not hidden by the coating of the first display element 1, at least one display pattern which can be seen by the user in an opening 19 or an aperture 80 included in the first display element 1. This second display element 2 is remote from the main bearing surface 51 by lower return means 52, here represented by elastic return means like a spring, which tend to push it towards the first display element 1, from which it remains nevertheless remote by means of spacing means 60, which ensure a minimum functional clearance between this first display element 1 and this second display element 2.

More particularly, these spacing means 60 include damping means, which are arranged to provide a shock-proof stopper function to prevent any contact between said second display element 2 and said first lower surface 12 during a shock undergone by the timepiece carrying said display device 100; in particular these spacing means 60 advantageously include at least one elastic element, to absorb, where appropriate, the effects of an impact, for example during a fall of the timepiece, and to safeguard the integrity of these two display means 1 and 2. Preferably, these spacing means 60 are in an area invisible to the user, for example in the vicinity of the axis of rotation of the display wheel set to reduce tangential friction during a change of display; they can indifferently be carried by the first display element 1, by the second display element 2, or else by a fixed element 50 connected to the platen for example. These spacing means 60 are arranged to ensure a non-zero functional clearance Em, visible in FIG. 1, between this second display element 2 and the first lower surface 12. Advantageously, their bearing surface 600 is that of a component made of Teflon® or one that is Teflon-coated or the like, to reduce tangential friction when changing display.

In this case of a sapphire dial 1, the dial may in particular include a sapphire plate 120, with a paint or coating 180 under the sapphire in order to colour the dial. More particularly, an opening or a transparent or translucent area 19, or else an aperture 80, for a display, leaves a transparent part or else a through orifice in the dial 1. The second display element 2 which is below appears to be at the same level as the dial 1, because it is only very closely spaced from the visible dial (distance E in FIG. 1). It is therefore necessary to minimise this distance E and to control it. In order to guarantee a minimum distance, while avoiding friction on the display areas which might leave visible traces of wear, it is judicious to place distance adjustment elements, constituted by these spacing means 60 or including these spacing means 60, and/or by these upper return means 63 which will be detailed below, outside the visible area, and in particular under an opaque area of the coating 180. In a particular embodiment, the lower return means 52 include at least one elastic return element 52, which presses the second movable display element 2 against the stop surfaces 600 included in these spacing means 60.

Figure 7:
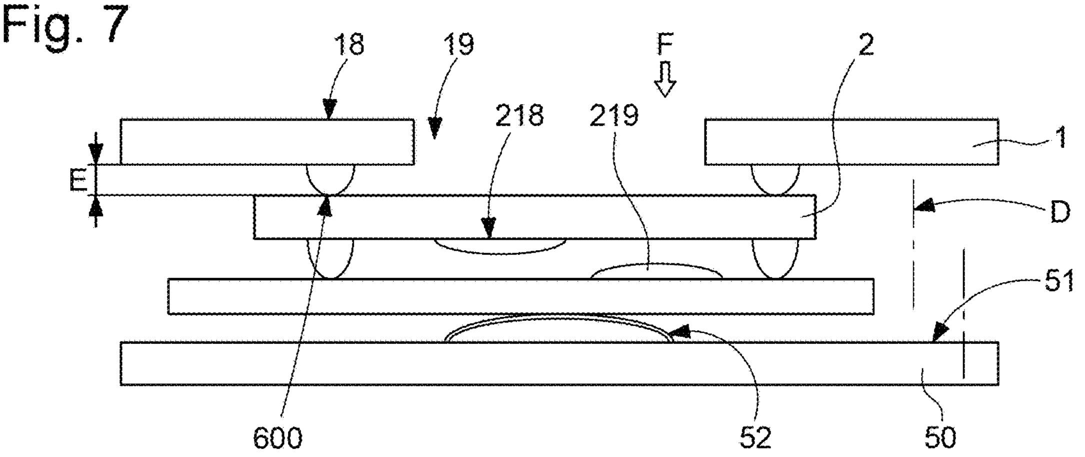
FIG. 7 shows, similarly to FIG. 1, a variant of the invention, including several second superimposed display elements, with lower return means pushing the second display element closest to the platen, such as a unit disc of a date display, towards the second display element closest to a dial constituting the first display element, bearing on a set of lower spacing means, while the second display element closest to the dial, which is here a transparent tens disc of the date, is separated from this dial by a set of upper spacing means.
Figure 8:
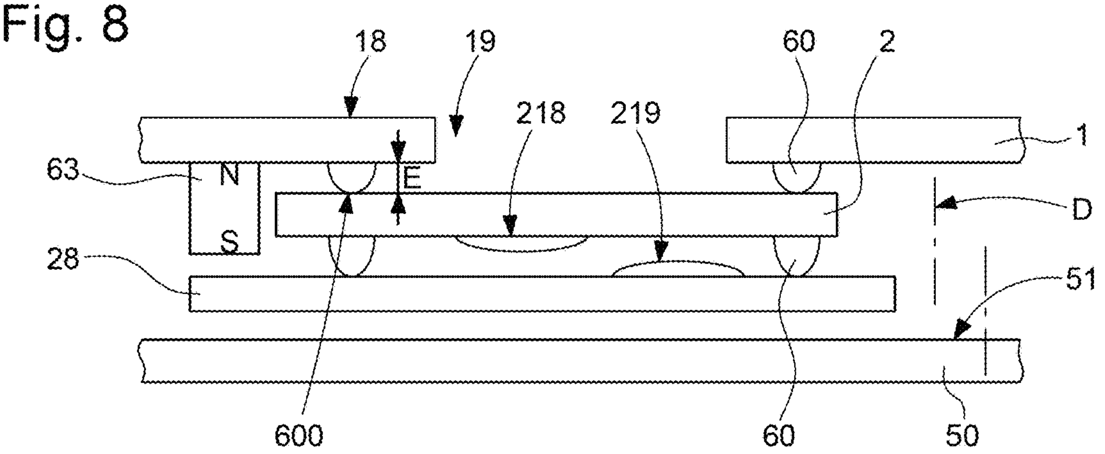
FIG. 8 shows, similarly to FIG. 7, a variant where the lower spring repulsion is replaced by an upper attraction, by a magnet fixed to the dial, of the second display element closest to the platen.

In a particular embodiment, at least a second display element 2 is a second upper display element which includes, on the one hand at least a second screen surface 218 visible to the user and which is arranged to, or else hide from the sight of the user any second upper surface 21 of another second display element 2 which is a second lower display element, or else to show the user two superimposed patterns. This second lower display element is located between the second upper display element 2 and the main bearing surface 51, in the frontal viewing direction F substantially normal to a plane tangent to the first upper surface 11 of the first display element 1 or to a second upper surface 21 or to the main bearing surface 51. A second viewing area 219 is arranged to allow the user to see at least a second upper surface 21, and/or a second lower surface 22 when the second display element 2 is transparent, of a second lower display element located between the second upper display element and the main bearing surface 51, in the frontal direction F, as can be seen in FIG. 7. FIGS. 7 and 8 show two second display elements 2, which are two display discs: in order to produce a pattern made up of two digits substantially at the same height (spaced by a distance E which is as small as possible), several display elements movable relative to each other can be positioned by stops and elastic or magnetic return elements. The two patterns therefore appear to be at the same height if it is low. The embodiments of FIGS. 7 and 8 allow to produce a large date for example, with the second upper display element 2 which is a tens disc which carries tens markings 218, and the second lower display element 2 which is a unit disc with unit markings 219.

Optical conductor means here an image transfer device, to bring an image present on a lower level to the user, possibly with a magnification effect, or the like. More particularly, such an optical conductor includes at least one bundle of plastic or polymer or glass optical fibres, or the like. Another case of distance adjustment thus relates to optical fibres, as illustrated in FIGS. 2 to 6. The use of an optical conductor or bundle of optical fibres aims at moving a display pattern in a frontal direction F over a large distance (via the optical conductor or the bundle of optical fibres). This allows other means of distance adjustment. As a reminder, adjusting the distance between the pattern to be reproduced and the optical conductor or the bundle of optical fibres is essential to avoid obtaining a fuzzy pattern.

More particularly, at least the first display element 1 includes at least one optical conductor or a bundle of optical fibres 70, an upper surface 71 of which is visible to the user to whom it transmits the image of a second upper surface 21 of a second display element 2, in the vicinity of a lower surface 72 included in the optical conductor or bundle of optical fibres 70, and the lower surface 72 closest to the main surface 51 then constitutes the first lower surface 12 of the first display element 1.

More particularly still, the device 100 includes spacing means 60, which include a support surface 600 projecting, relative to the lower surface 72 of the bundle of optical fibres 70, towards the second display element 2 closest to the first display element 1 in order to protect the bundle of optical fibres 70.

More particularly still, the device 100 includes upper return means 63, which include a bearing surface 600 projecting from the lower surface 72 of the bundle of optical fibres 70 towards the second display element 2 closest to the first display element 1 in order to protect the bundle of optical fibres 70, and lower return means 52 are arranged to bearingly press this second display element 2 closest to the first display element 1 bearing on the bearing surface 600, to guarantee the sharpness of the image transmitted by the at least one bundle of optical fibres 70.

The lower return means 52 can take different forms: mechanical, magnetic or other return means. In a particular embodiment, as in FIGS. 1, 2, and 7, these lower return means 52 are elastic return means, such as springs, disposed to bear, on the one hand on the main surface 51, and on the other hand on at least a second display element 2. In other embodiments, as in FIG. 5, some of these lower return means 52 are lower magnetic return means 53, which are arranged to cooperate in attraction or repulsion with at least part of a second display element 2, such as for example a magnetic and/or ferromagnetic rotation shaft 29, to move it away from the main surface 51.

In a particular embodiment with several second display means 2, the device 100 advantageously includes spacing means 60 which are adjusted to ensure the relative mobility between the first display element 1 and all the second display means 2 without contact between them.

More particularly, the spacing means 60, and/or the upper return means 63, are adjustable, to adjust the distance between each second upper surface 21 of each second display element 2 and the first lower surface 12 of the first display element 1, above a minimum value guaranteeing the relative mobility between the first display element 1 and all the second display means 2 without contact between them.

In a particular embodiment, the device 100 includes spacing means 60, at least part of which is formed by upper elastic return means 61.

Figure 2:
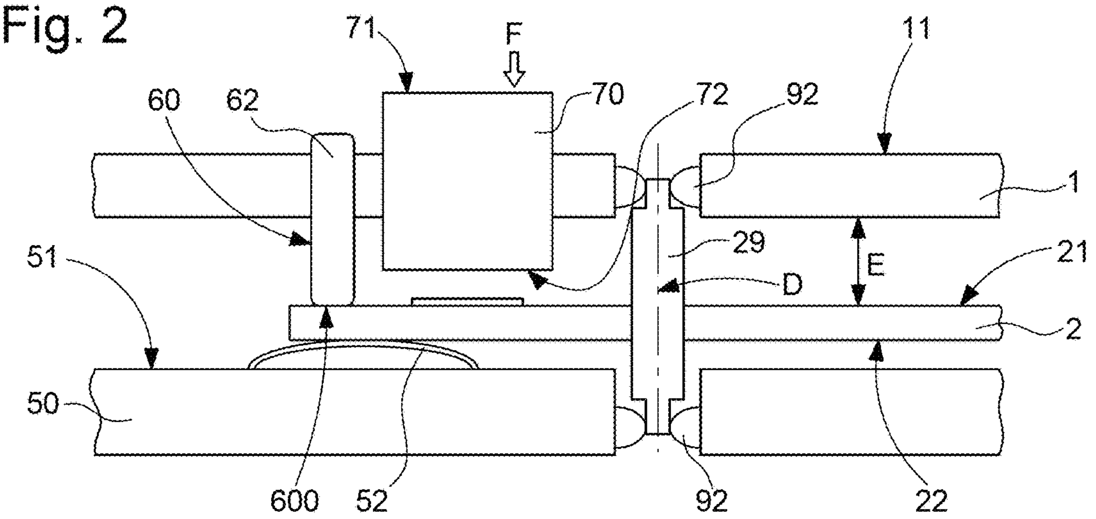
FIG. 2 shows, similarly to FIG. 1, another variant of the invention, wherein the first display element is not necessarily transparent, but carries an optical conductor here formed by a bundle of optical fibres, an upper surface of which shows the user the pattern carried by the second display element under the beam; this second display element is here a disc carried by a shaft pivoted in two bearings, and the axis of rotation of which is substantially parallel to the frontal viewing direction; the second display element is, again, urged by a spring supported on a platen, towards a bearing pin fixed on the first display element.

In a particular embodiment, the device 100 includes spacing means 60, at least part of which includes at least one straight rigid mechanical stop 62, as shown in FIG. 2. An axial adjustment in the frontal direction F by a pin, a screw, or another mechanical element, is possible, for example with a screw cooperating with an internal thread included in the first display element 1.

Figure 3:
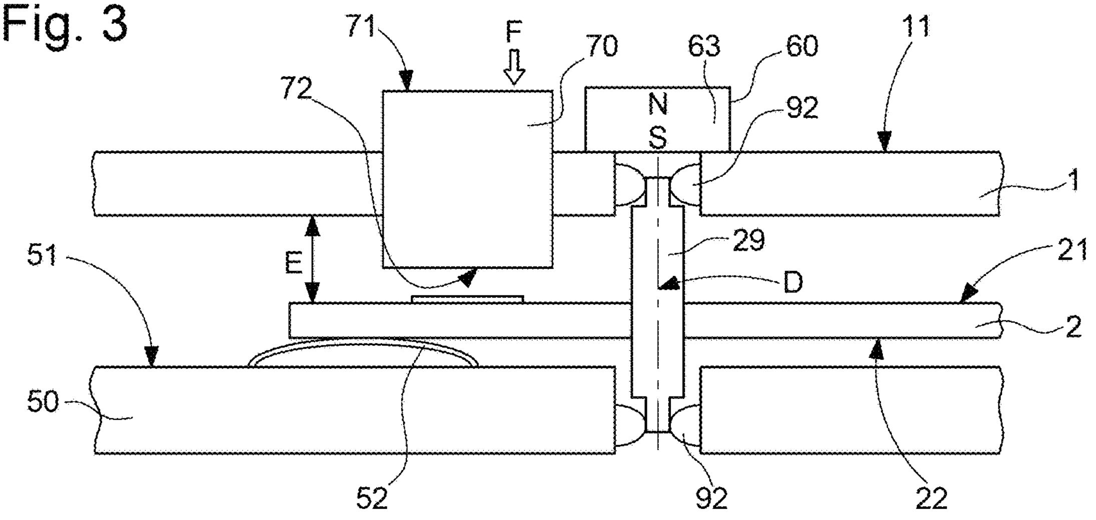
FIG. 3 shows, similarly to FIG. 2, another variant of the invention, where an upper magnet cooperates with the shaft of the second display element, and provides a pulling of the second display element towards the first display element.
Figure 4:
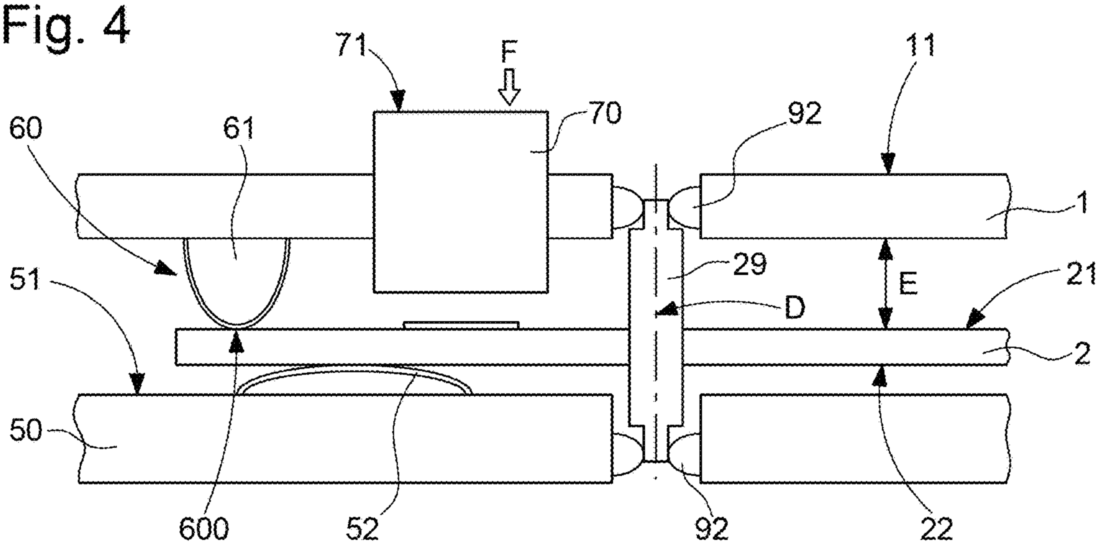
FIG. 4 shows, similarly to FIG. 2, yet another variant of the invention, where part of the spacing means is formed by at least upper elastic return means disposed between the first display element and the second display element.
Figure 5:
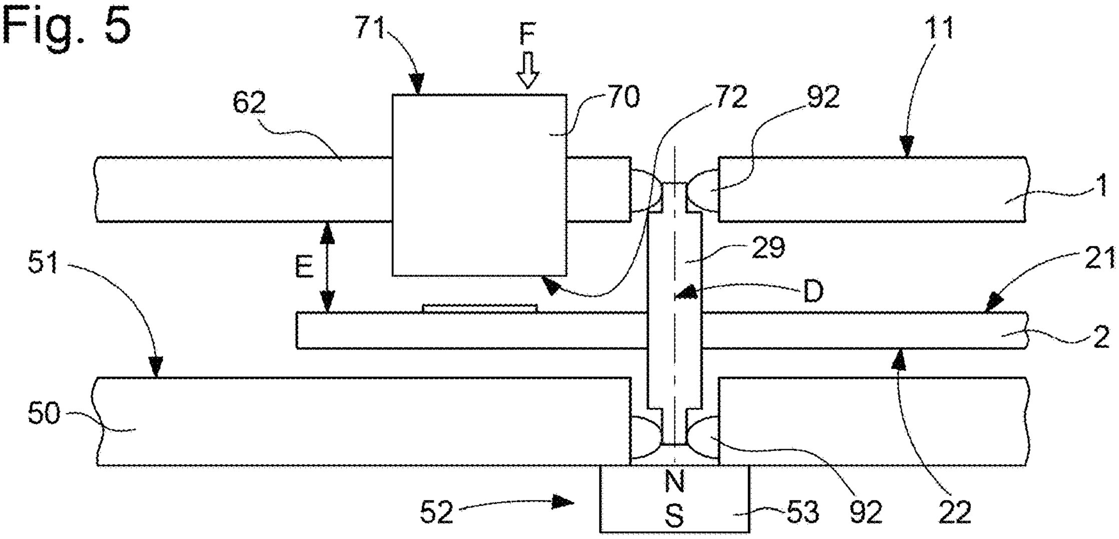
FIG. 5 shows, similarly to FIG. 3, a symmetrical variant, where a lower magnet cooperates with the shaft of the second display element, and ensures a pressure of the second display element towards the first display element.
Figure 6:
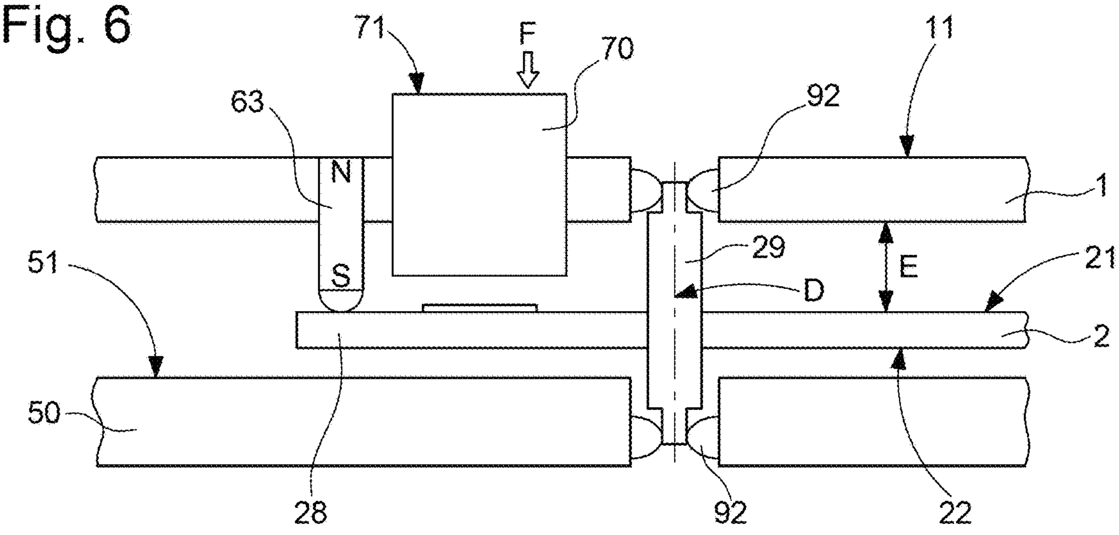
FIG. 6 shows, similarly to FIG. 2, yet another variant of the invention, where part of the spacing means is formed by at least one magnet fixed to the first display element and cooperating in attraction with a magnetic or ferromagnetic area that the second display element includes.

In a particular embodiment, and as visible in FIGS. 3 and 6, the device 100 includes upper return means 63, at least part of which is formed by at least upper magnetic return means, which are arranged to cooperate in attraction or repulsion with at least one magnetic and/or ferromagnetic part 28 or a magnetic and/or ferromagnetic shaft 29 of a second display element 2 to move it away from the first lower surface 12 of the first display element 1. Thus, more particularly, at least a second display element 2 is pivotally movable about a pivot axis D and includes a shaft 29 guided in at least one bearing 92 included in the fixed part 50 and/or the first display element 1, and the upper magnetic return means 63 are arranged to cooperate in attraction or repulsion with this shaft 29 which is magnetic or ferromagnetic. FIG. 3 illustrates an adjustment of the distance by adjusting the position of the platform of the second display element 2 on its shaft 29, and by taking up the clearance in the pivoting movements 92 with an upper magnet 63. Taking up the clearance by an elastic element is also possible.

In the variant of FIG. 6, at least a second display element 2 is pivotally movable about a pivot axis D and includes a shaft 29 guided in at least one bearing 92 included in the fixed part 50 and/or the first display element 1, and includes a magnetic or ferromagnetic area 28 which is eccentric relative to this shaft 29, and the upper magnetic return means 63 are arranged to cooperate in attraction or repulsion with this magnetic or ferromagnetic area 28. FIG. 6 thus illustrates an adjustment of the distance with a magnet 63, the axial position of which in the frontal direction F is adjustable. The magnet 63 attracts the second display element 2. The friction point is positioned outside the display area. The adjustment system is insensitive to the possible badness of the wheel set, which is advantageous. The lower end of the magnet 63 here acts as a front stop.

The device 100 advantageously includes upper return means 63 and/or mechanical spacing means 60, which are adjustable in translation in a frontal viewing direction F, to refine the sharpness of the image visible to the user.

More particularly, the first display element 1 is fixed relative to the fixed part 50. More particularly still, the first display element 1 is a dial.

More particularly, the first display element 1 is movable relative to the fixed part 50.

More particularly, the first display element 1 includes at least one aperture 80 through which is visible at least a second upper surface 21 of a second display element 2.

More particularly, the surrounding of the aperture 80 is of variable section and/or of variable chromatic density.

More particularly, the surrounding of the aperture 80 includes a border 81 for delimiting a display.

More particularly, the second upper surface 21 visible through the aperture 80 by the user has the same appearance as the first upper surface 11 of the first display element 1.

More particularly, the first display element 1 is made of transparent material, and includes, on at least part of its first lower surface 12, a coating constituting a non-transparent surface visible to the user.

More particularly, at least a second display element 2 is transparent and includes at least one marking 26 arranged to cooperate with a complementary marking 27 included in the first display element 1 or another second display element 2 or the fixed part 50.

Figure 9:
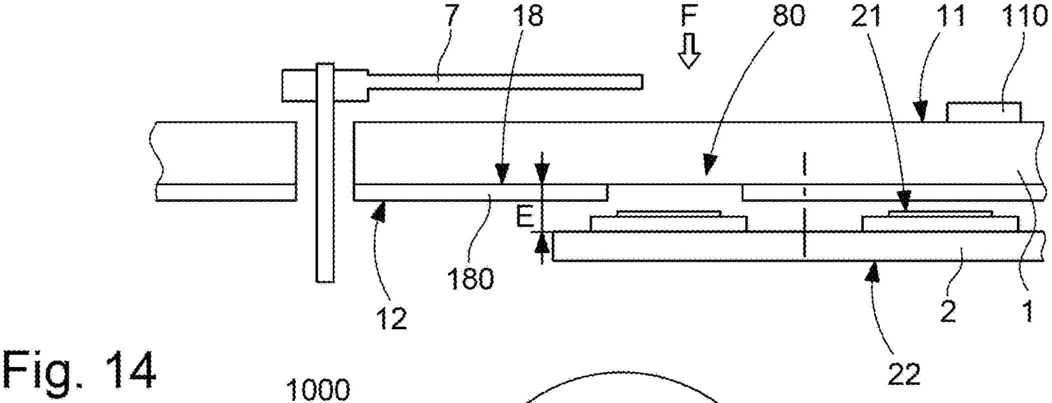
FIG. 9 shows, similarly to FIG. 1, a variant where the first display element is a sapphire dial, coated on the lower face, and which includes an aperture for viewing a lower display disc constituting the second display element; the sapphire dial carries floating appliques on its upper face closest to the user; a hand is conventionally movable above this same upper face.
Figure 14:
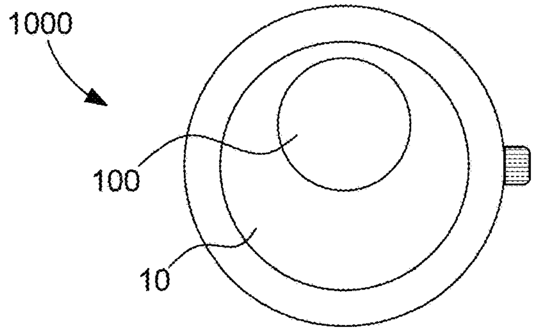
FIG. 14 shows, schematically and in plan view, a watch including, under a crystal, such a display device.

FIG. 9 illustrates a particular embodiment, where a watch 1000 includes a display device 100 with a dial 1 made of a transparent material, in this case a sapphire dial 1. The sapphire is coloured by a deposition 180 of paint, lacquer, varnish, PVD deposition or other coating on its lower face 12. It is also possible to deposit appliques on the upper/lower face. The appliques 21 or decals, or serigraphs, or the like, on the upper face 11 have an interesting visual effect because they seem to float above the dial. Indeed, the visible surface of the dial corresponds to the lower face of the sapphire. This transparent dial includes an aperture 80. The aperture 80 corresponds to an uncoated area on the lower face of the sapphire. There is no hole in the sapphire where the aperture is located.

Various arrangements prove to be advantageous for a good reading by the user:

- so that the effect is not disturbed by reflections, an anti-reflective coating is recommended on the upper face and on the lower face of the sapphire 1;
- in the case where it is sought to minimise the distance between the display disc and the dial, it is useful to have the thinnest possible decal on the display disc;
- different elements can be displayed in the aperture: display disc, hand, movement element, a partial skeleton view of the movement, or other.

Figure 10:
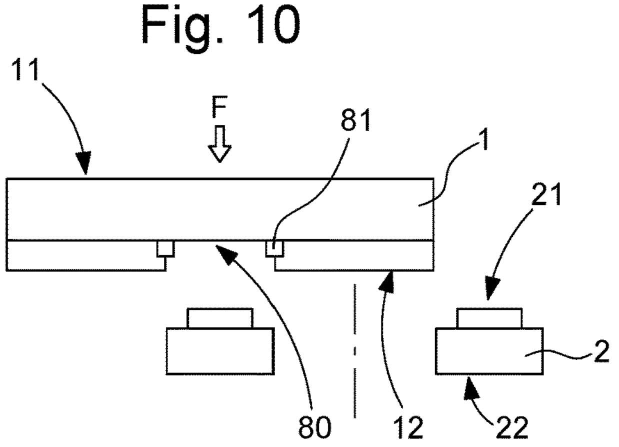
FIG. 10 shows, similarly to FIG. 9, a variant where the aperture is surrounded by a border.
Figure 11:
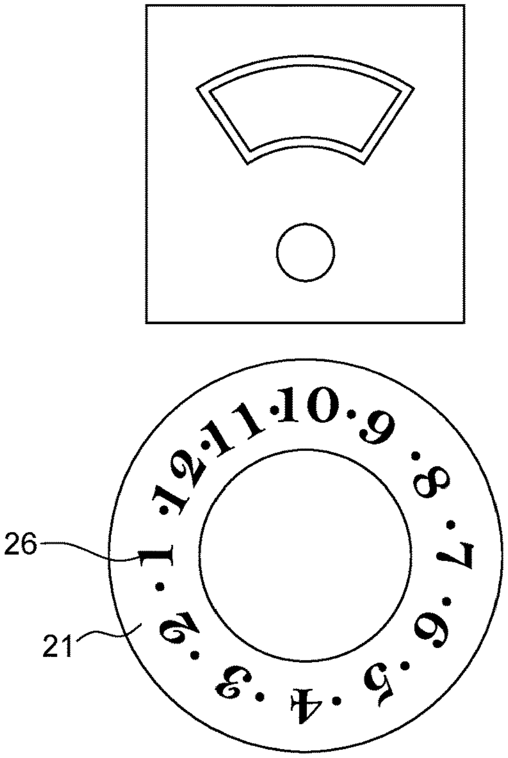
FIG. 11 shows, schematically and in plan view, side by side, and superimposed, the dial and the disc of FIG. 10.
Figure 12:
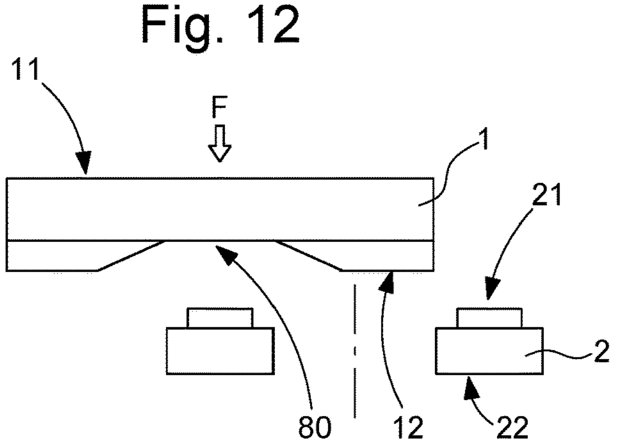
FIG. 12 shows, similarly to FIG. 9, a variant where the aperture is surrounded by a gradient.
Figure 13:
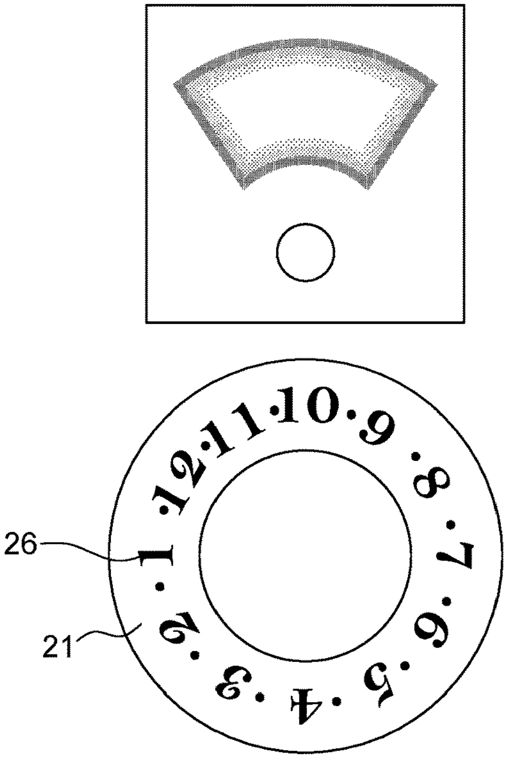
FIG. 13 shows, schematically and in plan view, side by side, and superimposed, the dial and the disc of FIG. 12.

The edge of the aperture 80 can be produced in several ways:

- as shown in FIG. 9, the coating forming the visible surface of the dial stops abruptly;
- as can be seen in FIG. 10, a border 81 (deposited by a decal or the like) delimits the line of the aperture 80;
- as shown in FIG. 11, the demarcation between the transparent area and the area completely covered with the coating is performed with a gradient, for example, a paint spray, or a chamfer, optionally sanded. The visual effect obtained is very interesting because the pattern appears in a fuzzy or hazy area; in particular, a gradual transition from a completely opaque layer to a transparent or translucent layer is achieved via an area of variable opacity. A variant can also be to use a variable colour density around the display area. In the particular variant of FIG. 10, the colour of the dial 1 and the background colour of the display disc 2 are advantageously identical. Of course in another variant the use of different colours is also possible.

The dial 1 can be engraved by laser technology on its lower face, in order to make cavities, which will then be filled with a coating to give a texture or relief to the dial 1.

This type of aperture 80 and dial 1 is particularly useful with the use of a flexible hand. Indeed, during impacts, the hand deforms and touches the dial or the crystal. It is therefore useful to combine the flexible hand (for example for the minutes) with a sapphire aperture (which displays the hours) according to the invention to prevent the flexible minute hand from interfering with another hand (for example the hour hand if this display had not been made in the aperture).

The invention also relates to a timepiece 1000, in particular a watch, including at least one such display device 100.

The invention claimed is:

1. A timepiece display device comprising:

a fixed part including a main bearing surface;

a first display element; and at least a second display element which are substantially flat superimposed above the fixed part, wherein at least one said second display element is subjected to opposing forces exerted in a frontal direction by lower return means, included in said device, and which tend to reduce a distance between said at least second display element and a first lower surface included in said first display element, and by upper return means which tend to increase the distance between said at least second display element and said first lower surface of said first display element without contact between said second display element and said first display element and/or by mechanical spacing means, wherein the mechanical spacing means includes a bearing surface arranged to provide a stop bearing function on a stop surface included in said second display element, to limit the travel of the second display element towards said first lower surface, wherein the force exerted by the lower return means on the second display element is exerted along a first plane in the frontal direction perpendicular to a bottom surface of the second display element, wherein the force exerted by the mechanical spacing means on the second display element is exerted along a second plane in the frontal direction perpendicular to a top surface of the second display element, wherein the second plane being different from the first plane, and wherein at least said lower return means are lower magnetic return means arranged to cooperate in attraction or repulsion with at least part of said second display element to move it away from said main surface.

2. The timepiece display device according to claim 1, wherein said device extends over several parallel or substantially parallel levels, and includes, separated from a user by a crystal, said first display element which is flat or having a radius of curvature greater than 10 cm, including a first upper surface visible to the user and opposite to said first lower surface, and, separated from said crystal by said first display element, at least one said second display element which is flat or having a curvature greater than 10 cm, including a second upper surface visible to the user and a second lower surface opposite to said second upper surface, each said second display element being movable above said main bearing surface, and wherein said lower return means tend to move at least one said second display element away from said main surface to bring said at least one said second display element closer to said first lower surface, and wherein said upper return means and/or said spacing means are arranged to ensure a functional clearance Em between said at least one said second display element and said first lower surface.

3. The display device according to claim 2, wherein said first display element includes at least a first screen surface visible to the user and arranged to hide from the sight of the user at least part of said second upper surface of said second display element located between said first display element and said main bearing surface, in a frontal viewing direction substantially normal to a plane tangent to said first upper surface of said first display element or to said second upper surface or to said main bearing surface, and also includes at least a first viewing area which is an opening or an optical conductor or a transparent or translucent area, the at least a first viewing area of which is arranged to allow the user to see at least part of said second upper surface, and/or said second lower surface when said second display element is transparent, of said second display element located between said first display element and said main bearing surface, in said frontal direction.

4. The display device according to claim 3, wherein said device includes said spacing means, said bearing surface of which is arranged to cooperate with said stop surface included in said second upper surface of said second display element, in which a stopper surface is masked by said first screen surface and is not visible to the user.

5. The display device according to claim 1, wherein at least one said second display element is a second upper display element which includes, at least a second screen surface visible to a user or hidden from the sight of the user, any second upper surface of another said second display element which is a second lower display element located between said second upper display element and said main bearing surface, in a frontal viewing direction substantially normal to a plane tangent to said first upper surface of said first display element or to said second upper surface or to said main bearing surface, or else to show the user two superimposed patterns, and at least a second viewing area which is an opening or an optical conductor or a transparent or translucent area, the at least a second viewing area of which is arranged to allow the user to see at least one said second upper surface, and/or said second lower surface when said second display element is transparent, of said second lower display element located between said second upper display element and said main bearing surface, in said frontal direction.

6. The display device according to claim 1, wherein said device includes said spacing means, which include damping means arranged to provide a shock-proof stopper function to prevent any contact between said second display element and said first lower surface during a shock undergone by the timepiece carrying said display device.

7. The display device according to claim 1, wherein said device includes said spacing means which are adjusted to ensure a relative mobility between said first display element and all said second display elements without contact between them.

8. The display device according to claim 7, wherein said spacing means are adjustable to adjust the distance between each second upper surface of each second display element and said first lower surface of said first display element, above a minimum value guaranteeing the relative mobility between said first display element and all said second display element without contact between them.

9. The display device according to claim 1, wherein said device includes said spacing means, at least part of which is formed by upper elastic return means.

10. The display device according to claim 1, wherein said device includes said spacing means, at least part of which includes at least one straight rigid mechanical stop.

11. The display device according to claim 1, wherein said device includes said upper return means at least part of which is formed by at least upper magnetic return means arranged to cooperate in attraction or repulsion with at least one magnetic and/or ferromagnetic part of said second display element to move it away from said first lower surface of said first display element.

12. The display device according to claim 11, wherein at least one said second display element is pivotally movable about a pivot axis and includes a shaft guided in at least one bearing included in said fixed part and/or said first display element, and wherein said upper magnetic return means are arranged to cooperate in attraction or repulsion with said shaft which is magnetic or ferromagnetic.

13. The display device according to claim 11, wherein at least one said second display element is pivotally movable about a pivot axis and includes a shaft guided in at least one bearing included in said fixed part and/or said first display element, and includes a magnetic or ferromagnetic area which is eccentric relative to said shaft, and wherein said upper magnetic return means are arranged to cooperate in attraction or repulsion with said magnetic or ferromagnetic area.

14. The display device according to claim 1, wherein at least two said second display elements are staggered at different distances from said main surface, and are kept separate from one another by said spacing means included in said device.

15. The display device according to claim 1, wherein at least said first display element includes at least one optical conductor or a bundle of optical fibres, an upper surface of which is visible to a user to whom it transmits an image of a second upper surface of said second display element, and said lower surface closest to said main surface then constitutes said first lower surface of said first display element.

16. The display device according to claim 15, wherein said device includes said spacing means, which include said bearing surface projecting relative to said lower surface of said bundle of optical fibres towards said second display element closest to said first display element in order to protect said bundle of optical fibres, and wherein said lower return means are arranged to bearingly press said second display element closest to said first display element against said bearing surface.

17. The display device according to claim 15, wherein said device includes said upper return means, which include said bearing surface projecting relative to said lower surface of said bundle of optical fibres towards said second display element closest to said first display element in order to protect said bundle of optical fibres, and wherein said lower return means are arranged to bearingly press said second display element closest to said first display element against said bearing surface, to ensure the sharpness of the image transmitted by said at least one bundle of optical fibres.

18. The display device according to claim 1, wherein said device includes said upper return means and/or said mechanical spacing means, which are adjustable in translation in a frontal viewing direction, to refine the sharpness of an image visible to the user.

19. The display device according to claim 1, wherein said first display element is fixed relative to said fixed part.

20. The display device according to claim 19, wherein said first display element is a dial.

21. The display device according to claim 1, wherein said first display element is movable relative to said fixed part.

22. The display device according to claim 1, wherein said first display element includes at least one aperture through which is visible at least a second upper surface of said second display element.

23. The display device according to claim 22, wherein a surrounding of said aperture is of variable section with a gradual transition from a completely opaque layer to a transparent or translucent layer via an area of variable opacity.

24. The display device according to claim 22, wherein a surrounding of said aperture includes a border for delimiting a display.

25. The display device according to claim 22, wherein said second upper surface visible through said aperture by the user has the same appearance as said first upper surface of said first display element.

26. The display device according to claim 1, wherein said first display element is made of transparent material, and includes on at least part of its said first lower surface, a coating constituting a non-transparent surface visible to the user.

27. The display device according to claim 1, wherein at least one said second display element is transparent and includes at least one marking arranged to cooperate with a complementary marking included in said first display element or another said second display element or said fixed part.

28. A timepiece comprising at least one display device according to claim 1.

* * * * *